(No Model.)
E. R. PROCTER.
DIE FOR MAKING RATCHET NUTS.
No. 354,933.  Patented Dec. 28, 1886.
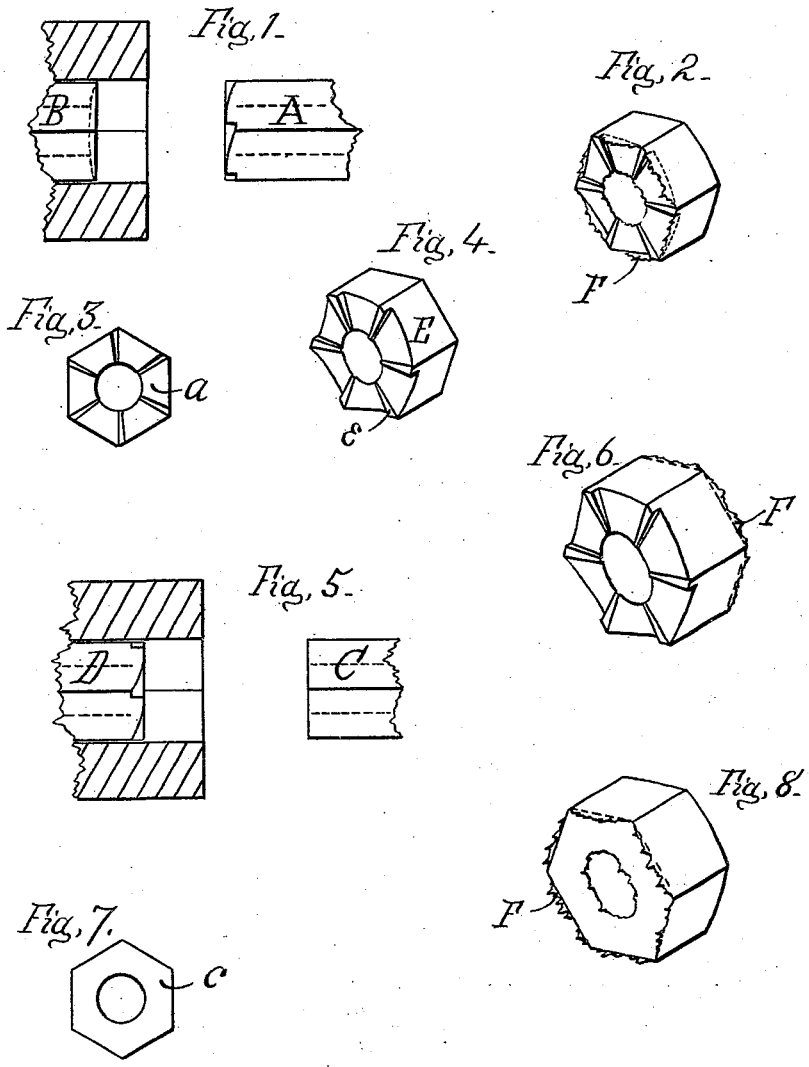
Attest
Wm. P. Jones,
K. B. Procter.
Inventor
Edwin R. Procter.

UNITED STATES PATENT OFFICE.

EDWIN R. PROCTER, OF WASHINGTON COURT HOUSE, OHIO.

DIE FOR MAKING RATCHET-NUTS.

SPECIFICATION forming part of Letters Patent No. 354,933, dated December 28, 1886.

Application filed March 15, 1886. Serial No. 195,342. (No model.)

*To all whom it may concern:*

Be it known that I, EDWIN R. PROCTER, of Washington Court House, Ohio, have invented a new and useful Improvement in the Method of Making Nuts, of which the following is a specification.

My invention relates, principally, to that class of nuts called "hot-pressed ratchet-teeth or notched nuts," whose bearing-surface next to the object to be fastened has ratchet-teeth, radial or otherwise.

Great difficulty is experienced by makers of hot-pressed nuts in producing ratchet-nuts, or nuts with indentations upon one of their surfaces, like the nuts used in following patents, to wit: Procter, No. 328,972, October 27, 1885, nut-lock; Procter, No. 333,155, December 29, 1885, nut-lock; Procter, No. 333,548, January 5, 1886, nut-lock, such nuts being liable, when first punched in the ordinary way, to be so bristling with "burrs" around the edges of teeth and so filled with metal in the indentations as to render necessary their being cleaned up by hand, by filing preferably—a process so expensive as to prohibit the sale of the finished nuts. Efforts heretofore made to remedy this evil have not been attended with success.

The object of my invention is to provide a method of manufacture by means of which said nuts may be produced rapidly and cheaply.

In order to represent mechanism or arrangement of parts through which my improved method may be carried out, I have annexed drawings, in which—

Figure 1 represents the arrangement of parts in common use for producing ratchet-nuts. Fig. 2 represents a ratchet-nut made in the common way previous to being "burred" by hand, its "burring" by machine being impossible. Fig. 3 represents the common form of plunger-bottom in use for producing the nut represented in Fig. 2. Fig. 4 represents a finished—*i. e.*, burred or trimmed—ratchet-nut. Fig. 5 represents the improved arrangement of parts for producing ratchet-nuts. Fig. 6 represents a ratchet-nut as made by the improved arrangement of parts shown in Fig. 5 previous to being burred by machine in the ordinary way. Fig. 7 represents the form of plunger-bottom which is used in producing the nut shown in Fig. 6. Fig. 8 represents an ordinary hot-pressed nut previous to being burred by machine in the ordinary way.

In the accompanying drawings, A represents a customary male die or plunger for producing ratchet-nuts like Fig. 2. B represents a customary female die for producing same.

*a* represents bottom of A.

C represents a male die such as it is the intention to use in producing the improved ratchet-nut shown in Fig. 6. D is the female die for the same purpose.

*c* represents the bottom of C.

E represents a finished ratchet-nut, and *e* the teeth of same.

F represents the burr or ragged edge on a hot-pressed nut as it comes from the stamping-dies.

My improved process consists in punching or stamping the ratchet-nuts out from hot bar-blanks by means of dies, male and female, actuated by customary machinery, the upper male die, C, or plunger being of plain form, *c*, and the lower female die, D, having matrical ratchet-teeth recesses conformed to the finished teeth. As the said plunger C strikes the hot blank, driving a portion of it against the lower forming or female die, D, which latter impresses the ratchet-teeth upon that surface of nut usually termed the "crown," a small portion of the heated metal at strike of plunger squashes out and drags back between the sides of latter and die-box, said squashed-out metal forming, when cold, a ragged edge or burr around the edges of the nut next to the plunger, which in my improved arrangement of parts produces a nut like Fig. 6, which can be used in a nut-locking device just as it comes from the stamp—to wit, in its untrimmed condition—if so desired, quite in contrast to a nut like Fig. 2, which has to be cleaned by hand, one notch at a time, before the teeth are available. The said nut Fig. 2 requires to be thus "hand-cleaned," because the forms of machinery in common use for trimming the burrs off of surface of nuts shave said surface clean, in which operation to entirely remove the burrs located in bottoms of indentations in nut would necessitate the removal or shaving off of the ratchet-teeth in the same operation, said teeth being in the same plane.

It is obvious from the above that by means of my improved method ratchet-nuts may be produced rapidly and cheaply.

I am aware that dies such as are used in the production of nuts having indentations on their working-faces are old.

I am aware that machines of ordinary construction, excepting that the male die has "inclined projections terminating in vertical faces," the piercing-rods having the customary relations to dies, have been used to make hot-pressed nuts whose ratchet-teeth, flush at their points with the surface of nut, do not extend to periphery of nut, and that other machines of ordinary construction, excepting that the male die has "inclined projections on its face" and the piercing-rod is the reverse as to location and movement of the customary relation to dies, have been used to make hot-pressed nuts similar to those above mentioned. I therefore disclaim invention in such features, broadly or separately considered; but What I do claim is—

1. In nut-making machines, the die D, having the inclined projections on its face extending from the customary central perforation to the periphery of die, substantially as described, for the purpose specified.

2. In nut-making machines, the combination, with the customary box and punch, of the die D, having the inclined projections on its face extending from the customary central perforation to the periphery of die, and the punch C, having a plain end, whereby the metal, when pressed, drags away from said projections instead of toward them, substantially as described, for the purpose specified.

EDWIN R. PROCTER.

Attest:
WM. P. JONES,
K. B. PROCTER.